(12) United States Patent
Sethi

(10) Patent No.: US 9,379,892 B2
(45) Date of Patent: Jun. 28, 2016

(54) TRUSTED MANAGER BRIDGE

(71) Applicant: Toshiba America Electronic Components, Inc., San Jose, CA (US)

(72) Inventor: Rakesh Sethi, San Jose, CA (US)

(73) Assignee: Toshiba America Electronic Components, Inc., Irvine, CA (US)

( * ) Notice: Subject to any disclaimer, the term of this patent is extended or adjusted under 35 U.S.C. 154(b) by 151 days.

(21) Appl. No.: 13/905,281

(22) Filed: May 30, 2013

(65) Prior Publication Data
US 2014/0359304 A1     Dec. 4, 2014

(51) Int. Cl.
*H04L 9/08*     (2006.01)
*G06F 21/55*    (2013.01)
*H04L 9/32*     (2006.01)

(52) U.S. Cl.
CPC ............... *H04L 9/088* (2013.01); *G06F 21/55* (2013.01); *H04L 9/3268* (2013.01)

(58) Field of Classification Search
CPC ........ G06F 21/55; H04L 9/088; H04L 9/3268
See application file for complete search history.

(56) References Cited

U.S. PATENT DOCUMENTS

| | | | |
|---|---|---|---|
| 6,279,128 B1 * | 8/2001 | Arnold ................. | G06F 21/567 714/49 |
| 7,318,150 B2 * | 1/2008 | Zimmer et al. ................. | 726/27 |
| 7,650,645 B1 * | 1/2010 | Langendorf et al. ............ | 726/27 |
| 7,836,269 B2 * | 11/2010 | Obereiner et al. ............ | 711/163 |
| 2003/0140245 A1 * | 7/2003 | Dahan et al. ................... | 713/200 |
| 2005/0204155 A1 * | 9/2005 | Ravi et al. ..................... | 713/200 |
| 2005/0268092 A1 * | 12/2005 | Shankar et al. ............... | 713/164 |
| 2007/0174910 A1 | 7/2007 | Zachman et al. | |
| 2011/0225406 A1 | 9/2011 | Nelson et al. | |
| 2011/0289600 A1 | 11/2011 | Rusakov | |
| 2014/0040639 A1 * | 2/2014 | Raam ........................... | 713/193 |

OTHER PUBLICATIONS

Raam, Farbod Michael—U.S. Appl. No. 61/480,518.*
Beyond the CPU: Defeating Hardware Based RAM Acquisition (Part 1:AMD Case; Joanna Rutkowska; COSEINC Advanced Malware Labs; Black Hat DC 2007; Feb. 28, 2007.
The Invisible Things Lab's Blog: Evil Maid Goes After TrueCrypt: http://theinvisiblethings.blogspot.com/2009/10/evil-maid-goes-after-truecrypt.html Nov. 7, 2012.

* cited by examiner

*Primary Examiner* — Kaveh Abrishamkar
*Assistant Examiner* — Tri Tran
(74) *Attorney, Agent, or Firm* — Ulmer & Berne LLP

(57) ABSTRACT

A system and method for securing processing devices includes a police bridge disposed in one or more data busses between a central processing and input/output peripherals, components or components. The police bridge is suitably disposed between northbridge logic and southbridge logic. Alternatively, or in addition to such placement, a police bridge is suitably place between southbridge logic and super I/O logic. A police bridge is suitably a system-on-chip or fixed or programmable hardware. The police bridge monitors or controls its associated bus to determine whether acceptable data, with an associated certificate in other embodiments, is being communicated and signaling is generated accordingly.

16 Claims, 6 Drawing Sheets

TRUSTED MANAGER BRIDGE

TECHNICAL FIELD

The subject application includes embodiments directed generally to security for digital processing systems. The application includes an embodiment specifically directed to improved security in connection with processors employing peripheral connection logic, such as northbridge or southbridge logic.

BACKGROUND

Modern digital processors, such as central processor units (CPUs), are frequently fabricated from a single semiconductor wafer or chip. The trend is to merge more functionality, such as memory control, video control, etc., into the same semiconductor substrate that forms a CPU having one or more associated cores.

While integrated functionality processors and supporting logic continues to grow, much of the functionality, such as interfacing with peripherals, directly or via ports, continues to be managed by complementary logic. Intel® processors have been fabricated with Intel's Hub Architecture, which architecture includes one or two data communications chips that allow the CPU to communicate with components or peripherals. One such architecture employs what is referred to as northbridge logic which was originally designed to work with complementary southbridge logic.

The northbridge served as an interface between the CPU and fast data devices, such as graphics and memory. The northbridge also interfaced with the southbridge which formed an interface to other peripherals or systems, such as a PCI bus, USB, IDE, ISA, BIOS, or legacy ports or peripherals.

As transistor density continues to increase, and design and fabrication techniques continue to improve, functionality such as northbridge are now found on the same die as the CPU, whereas earlier each had been comprised of one or more chips. In some instances, southbridge functionality is also integrated on the same die, resulting in still further speed increases and lower costs. Even when functionality is integrated, conceptual distinction between the CPU, northbridge and southbridge logic may still be maintained.

The proliferation of computers, and the information that is exchanged via computers, has given rise to a significant rise in malicious attacks targeted to compromise computer systems. Attacks are directed to securing access to sensitive information, such as financial, trade secret or personal information. Attacks may also hijack computer or data resources for surreptitious use.

Prevention or minimization of computer security risks has spawned an entire industry. Solutions include network barriers, such as firewalls, and antiviral and anti-hacking software. Also, operating system vendors and application vendors are continuously updating their software to address vulnerabilities to intrusion or hacking. However, certain aspects of hacking are difficult or impossible to prevent. Prevention is difficult even when whole-disk encryption is used, such as available from many vendors.

One example of a difficult-to-protect scenario is referred to as the "evil maid," so named because it is what might be encountered if one were to leave a computer in a hotel room, unattended. In this example, an attacker would boot a shutdown computer from a separate volume, such as booting from a CD, DVD, flash drive or external drive. The process writes a bootloader onto the targeted system. When the computer owner boots using the hacked bootloader and enters the encryption key, the key can be captured and stored for future retrieval, or even communicated to the hacker via the Internet.

Basically, there is little or no defense against attacks based on physical access to a computer. In addition to evil maid attacks, examples include the "cold boot" attack and the "stoned boot attack." Marc Briceno, Director of Product Management for the computer security company, Symantec, has stated:

No security product on the market today can protect you if the underlying computer has been compromised by malware with root level administrative privileges. That said, there exists well-understood common sense defenses against "Cold Boot," "Stoned Boot," "Evil Maid," and many other attacks yet to be named and publicized.

The subject application teaches embodiments that solve the above-noted problems, and others, and provides a system and method for increased security of computer systems and associated data.

OVERVIEW OF EXAMPLE EMBODIMENTS

Figure 1:
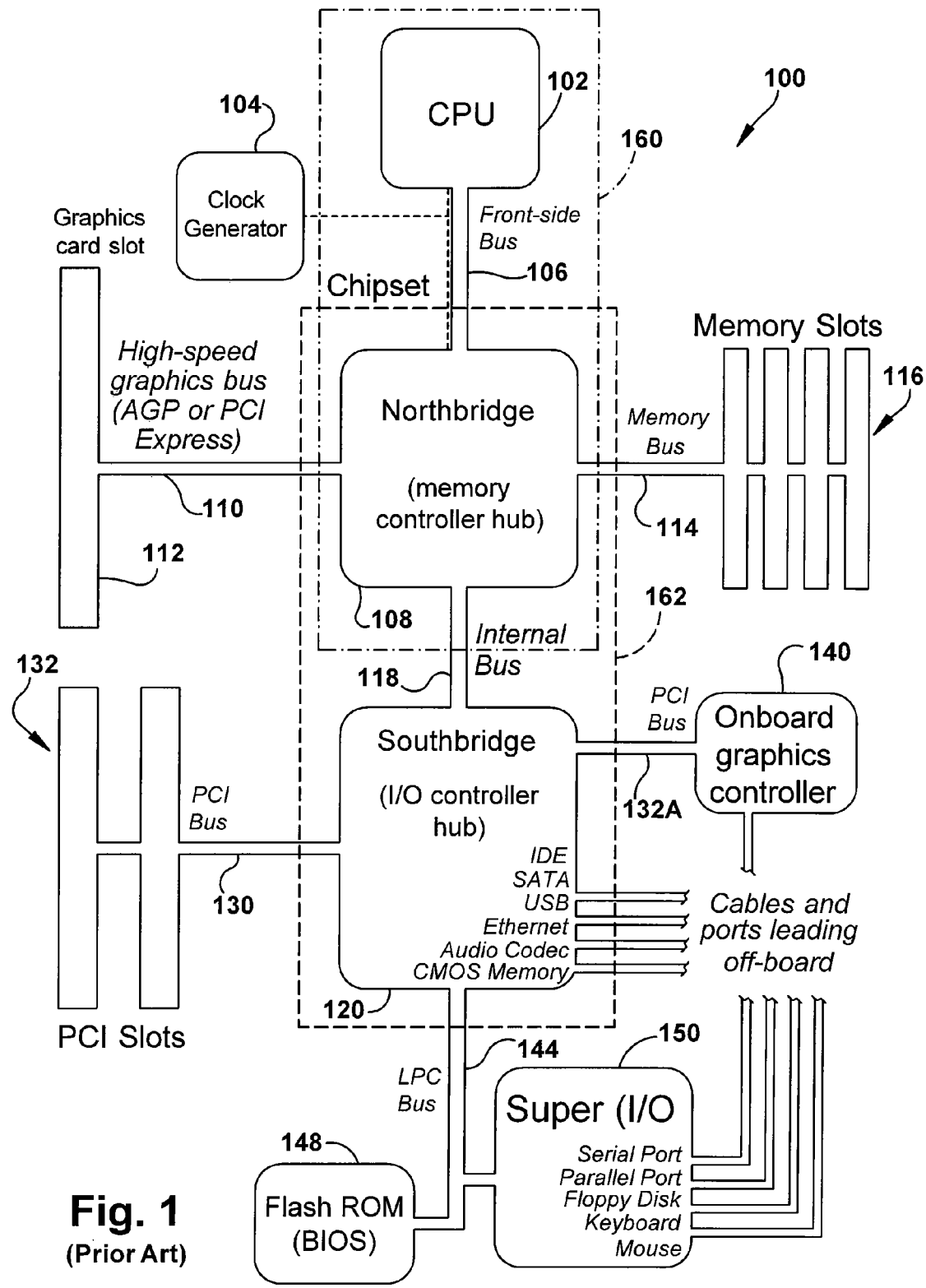
FIG. 1 illustrates a conventional northbridge/southbridge processor architecture.

FIG. 1 illustrates a prior art processor architecture 100 employing a CPU 102 and a clock 104. The CPU communicates data via a front-side bus 106 to northbridge logic 108. Northbridge 108 provides a gateway to relatively high-speed pathways, such as a graphics bus 110, typically associated with a graphics card slot 112. Northbridge 108 also typically provides connection via memory bus 114 to memory, suitably dual inline memory modules (DIMMs), single inline memory modules (SIMMS), etc., typically via memory slots 116. Northbridge 108 also typically provides a connection via internal bus 118 to southbridge logic 120 which provides a typical gateway to relatively slow pathways. Typical data pathways associated with a southbridge include a peripheral component interconnect (PCI) bus 130 typically associated with PCI slots 132 or an advanced graphic port (AGP) video connection. A PCI bus, such as that shown at 123A is sometimes associated with an onboard graphics controller 140. Other connections established via a northbridge may be via a low pin count (LPC) bus 144 which is associated with data flow associate with flash ROM 148 such as may be associated with BIOS, or a super I/O (input/output) controller 150. Other interfaces that may be associated with the southbridge include integrated drive electronics (IDE) connections, serial ATA (SATA), universal serial bus (USB) connections, Ethernet connections, Audio connections and slower memory connections. Super I/O controller 150 typically provides data connection for serial ports, parallel ports, floppy disks, keyboards or mice. In more modern processor designs, CPU 102 and northbridge 108 may be fabricated on a single chip to form a single unit 160. Additionally, some designs further incorporate the CPU, northbridge and southbridge on a single chip to form a single unit 162.

Figure 2:
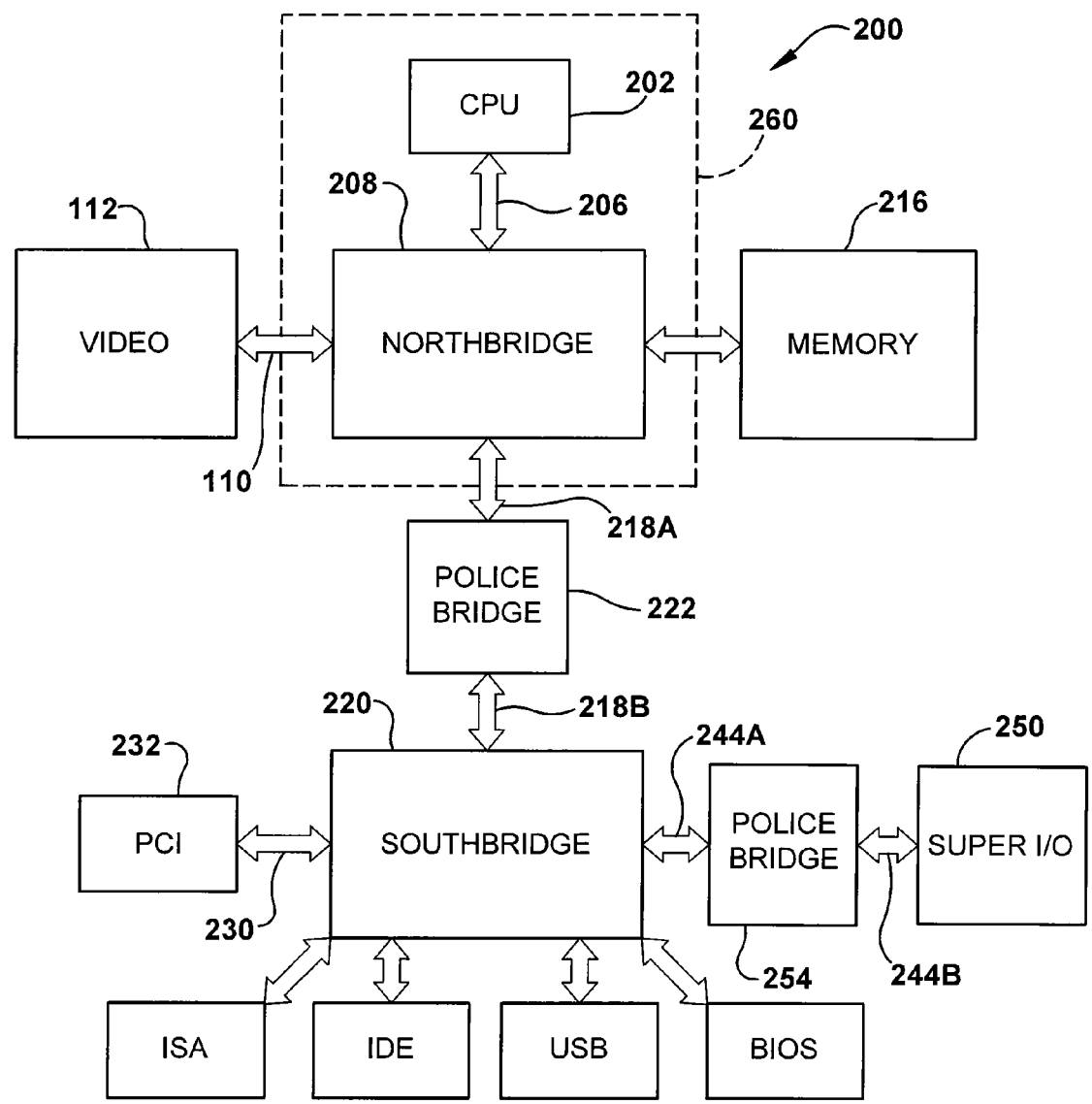
FIG. 2 illustrates a CPU architecture wherein one or two police bridged are implemented.

Turning now to FIG. 2, illustrated is a processor architecture 200 that provides additional safeguards relative to possible attacks. CPU Processor 202 is suitably connected via bus 206 to northbridge 208. Northbridge 208, in turn, suitably provides data connection via bus 110 to a video system 112, and via bus 214 to a memory system 216. Unlike earlier systems, an embodiment illustrated in FIG. 2 has associated with bus 218 a police bridge 222. In one embodiment, the police bridge monitors data on the bus 218. The police bridge, in a modified embodiment, suitably provides a gateway or control of data flow on bus 218, thus functionally forming bus components 218A and 218B. Further details of operation and construction embodiments of police bridge 222 are provided below.

Data from bus 218B is communicated with southbridge 220, suitably providing a gateway to PCI 232, as well as the other devices noted in connection with FIG. 1, above. Southbridge 220 is in data communication via bus 244A to super I/O controller 250. In another embodiment of FIG. 2, a police bridge 254 is associated with bus 244A, analogous to that noted in conjunction with police bridge 222, above. From the illustration in FIG. 2, it will be appreciated that police bridge 222, police bridge 254, or both, suitably provide a platform for monitoring or controlling data flow within the confines of processor system architecture, rather than via network gateways, or higher level systems such as at the operating system, driver or application level which suffers from the security deficiencies noted above.

It will be appreciated that the northbridge is suitably disposed on a single chip 260, along with the CPU, as noted above in connection with FIG. 1. In such a construct, police bridge 222 is suitably realized separately. While alternative embodiments suitably include integration of the northbridge and southbridge on a single chip, fabrication is more difficult given the substantial, additional required logic, particularly insofar as components of the police bridge would also need to be integrated on the chip to accommodate police bridge 222. Illustrated also is a signal output 260 suitable to output a signal representative of an unauthorized or invalid data communication on a bus, which signal suitably triggers further action or a memory erase to prevent further progress of any such session, and further to help eliminate any traces of an attempted intrusion.

Figure 3:
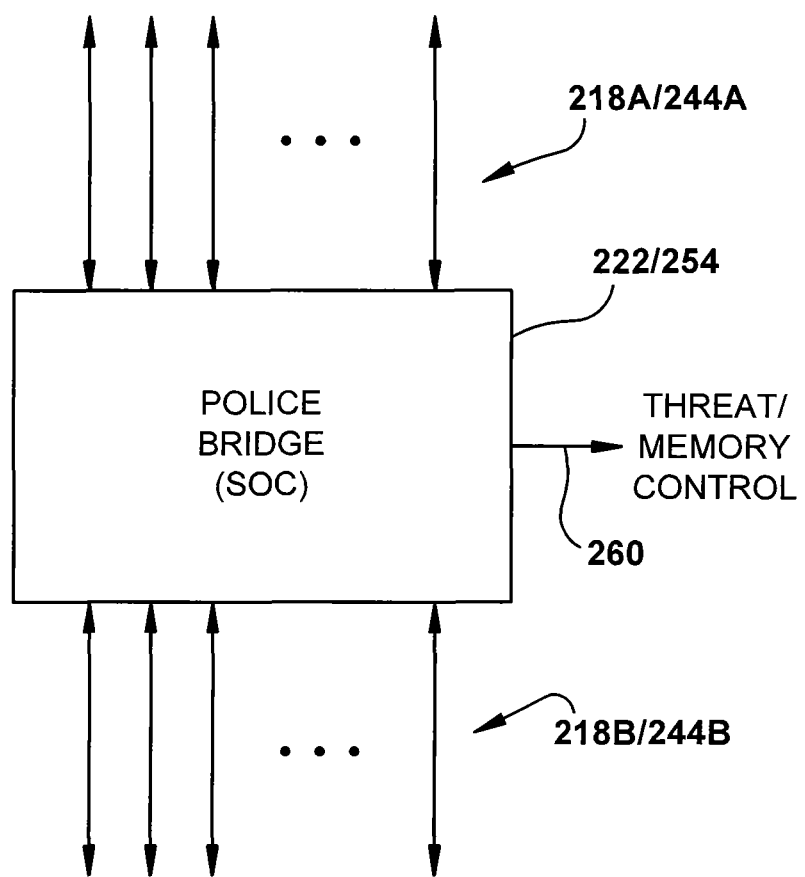
FIG. 3 illustrates an embodiment of a software operable police bridge.

Turning now to FIG. 3, illustrated is an embodiment of a police bridge suitably realized as a system-on-chip (SoC) architecture. As will be appreciated by one of ordinary skill in the art, SoC systems provide functionality of a programmable computer on an inexpensive, unified architecture, allowing for I/O, memory, control logic and associated support circuitry to facilitate a programmable processing device. In the illustration of FIG. 3, bus 218A and/or bus 244, suitably segmented as noted in connection with FIG. 2, are associated with the police bridge.

Figure 4:
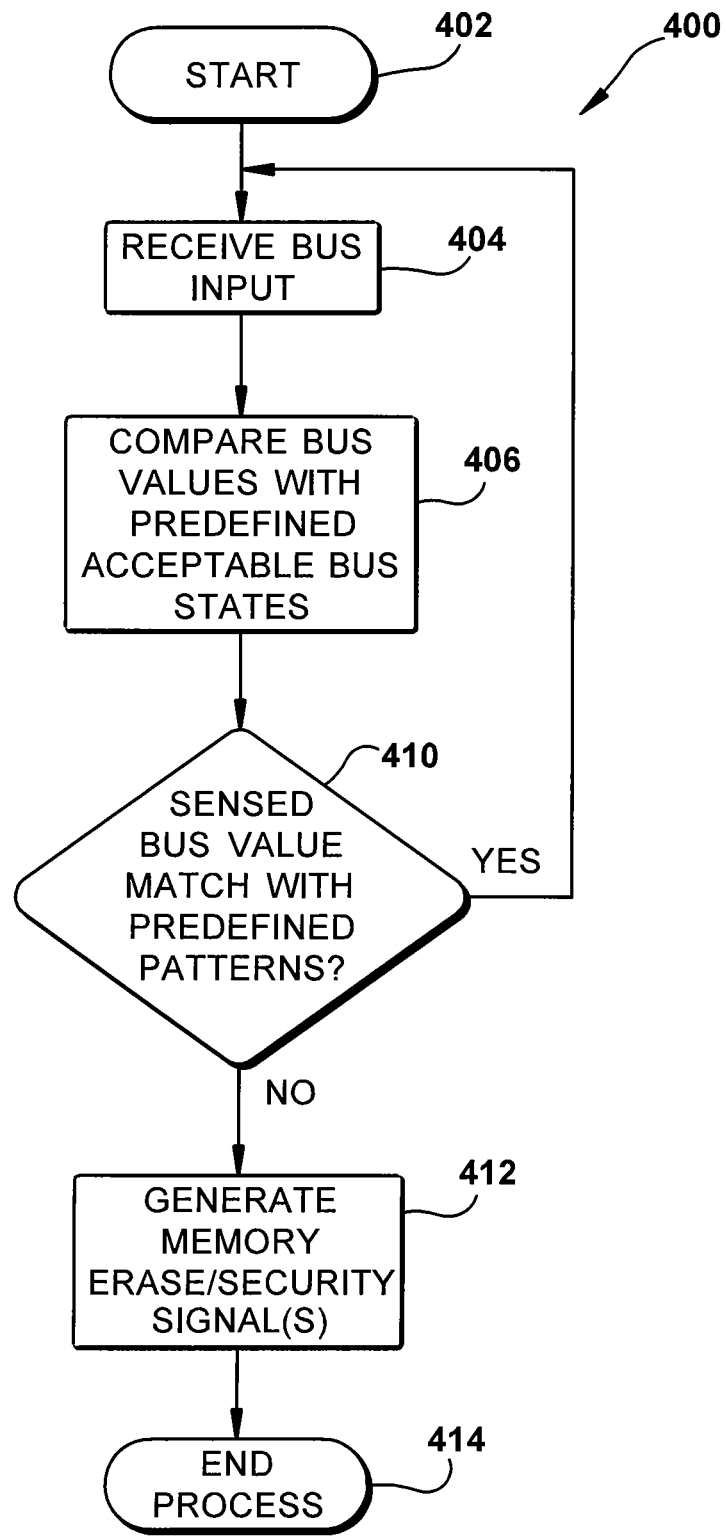
FIG. 4 is a flow chart of an embodiment of a police bridge functionality.

Referring now to FIG. 4, disclosed is a representative embodiment of a flowchart suitable for operation of one or both of the police bridges such as those illustrated in FIG. 3. Operation commences at 402, and progresses to block 404 wherein a state of an associated bus is determined. Such a state is suitably comprised of binary pattern communicated on bus lines, either a snapshot of a particular time period, or a continuous or bus-timing synchronized tracking of bus data traffic. Next, at block 406, a suitable association is made between a monitored bus state relative to data corresponding to acceptable bus traffic. Such association is suitably via direct comparison to acceptable bus data values or acceptable transmission protocols. Such protocols are suitably predefined or pre-authorized protocols which may be associated with an existing or generated trust certificate. Thus, if a data communication session sensed by the police bridge is not preauthorized or otherwise acceptable data communication, such as may be associated with communication with an external boot device or loader as noted above, the police bridge suitably generates a corresponding signal and/or terminates the communication session, thus preventing functioning of the processing device in view of such data. In another embodiment, the police bridge suitably generates a higher level, alternative or secondary communication relative to either the northbridge or southbridge, depending on relative positioning thereof. Such session is also suitably accomplished in connection with a new certificate generated in conjunction with the police bridge, which certificate is suitably destroyed after completion of data communication. Block 410 provides for determination as to whether a communication session is completed, and whether the aforenoted problem sessions are encountered. Progress is either returned to further bus states at 404, or a memory erase or security breach signal is generated at 412 if so determined. The process is completed at 414 at the end of a data communication session.

Figure 5:
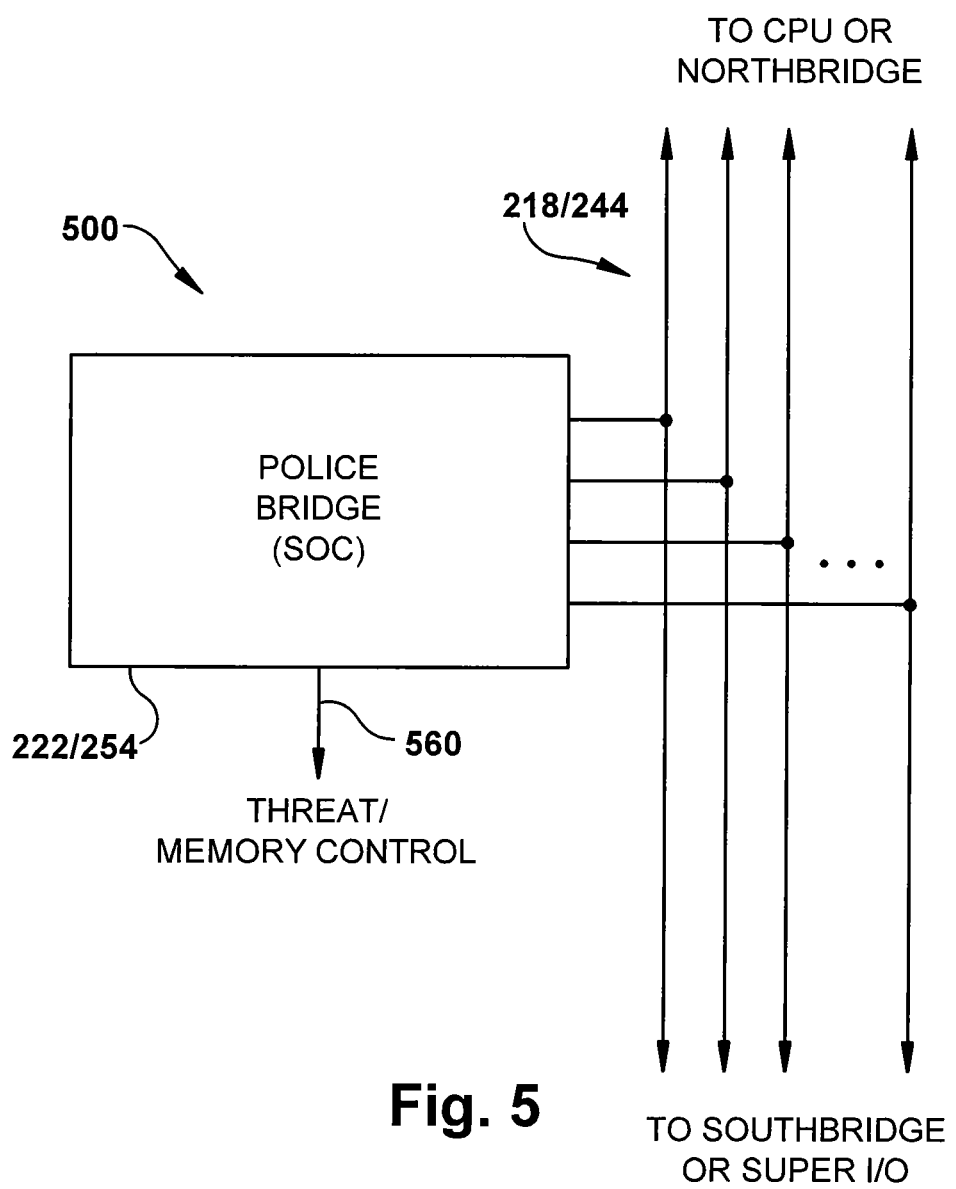
FIG. 5 illustrates another embodiment of a software operable police bridge.

FIG. 5 illustrates an embodiment 500 wherein the police bridge 222 and/or 254 is in data communication with bus 218 or 244 in a non-invasive manner. Such a connection enables "sniffing" of a state of the bus so as facilitate generation of a threat or memory control signal 560, but which embodiment does not facilitate interruption of a bus path or substitution or supplementation of a bus communication protocol or certificate.

Figure 6:
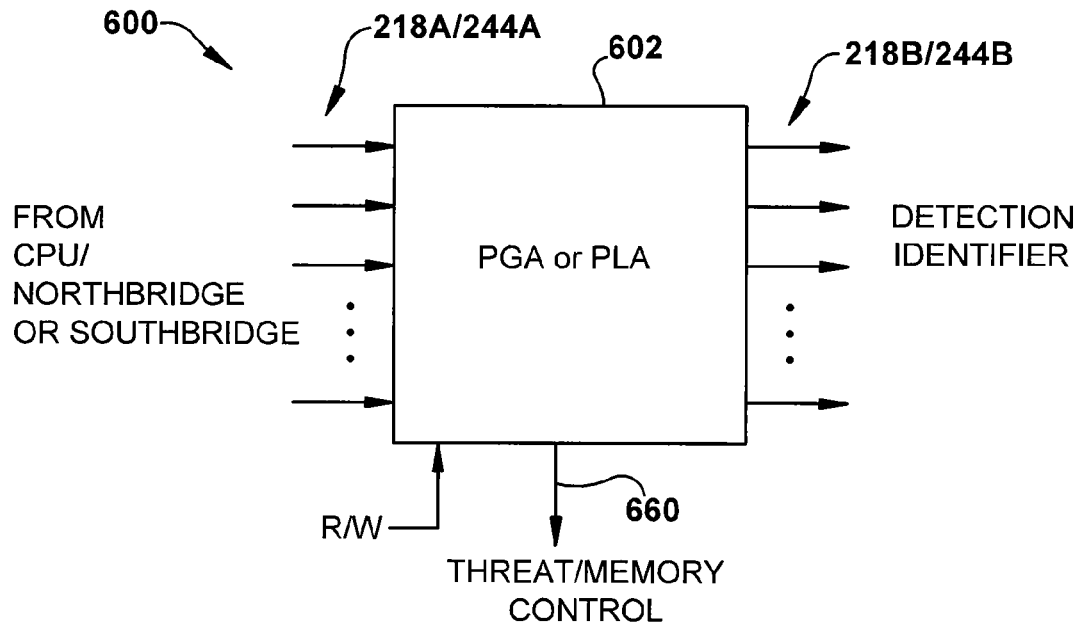
FIG. 6 illustrates another embodiment of a police bridge that is hardware based or logic configurable.

The representative embodiments noted above in connection with the police bridge are suitably complemented or substituted with a non-SoC implementation. FIG. 6 illustrates an embodiment 600 wherein police bridge 602 is suitably comprised of a programmable read-only memory (PROM), programmable logic array (PLA) or programmable gate array (PGA). Such a logic implementation advantageously facilitates inexpensive and alterable configuration as will be appreciated by one of ordinary skill in the art. It will be appreciated that the embodiment of FIG. 6 is illustrative as disposed within an associated bus, but that a sniffing interconnection as detailed above is also suitable, and more conducive to such type of logic. As noted above, a threat signal or memory control signal is generated at 660 in accordance with operation of the associated logic.

Figure 7:
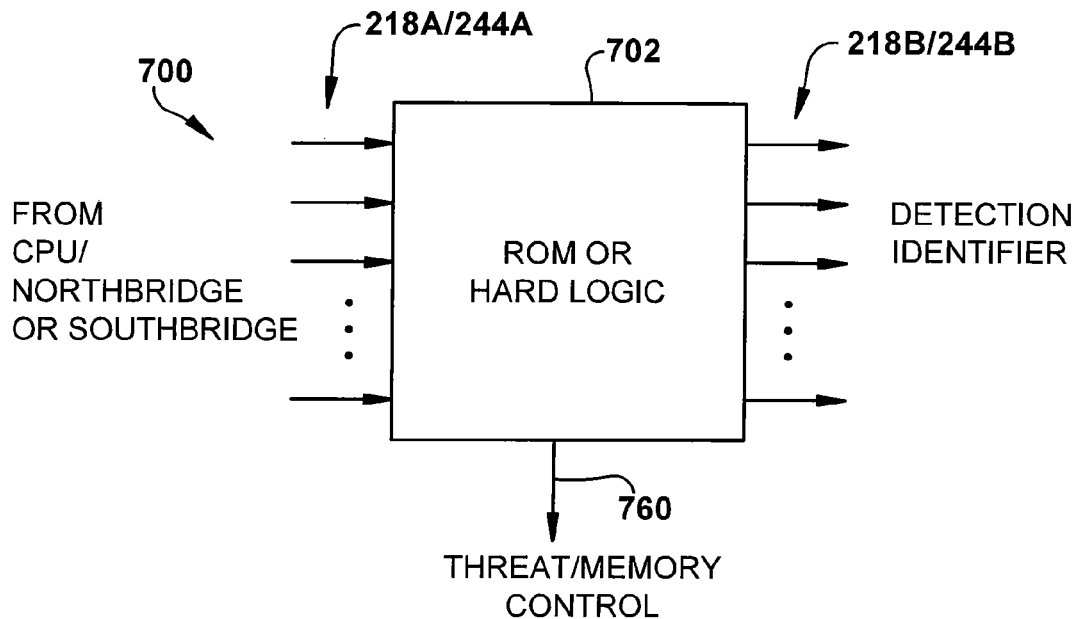
FIG. 7 illustrates another embodiment of a police bridge that is hardware based.

FIG. 7 illustrates a fixed-logic implementation 700 of a police bridge 702 analogous to that of FIG. 6. In the subject embodiment, a threat signal or memory control signal 760 is suitably generated in accordance with hard-wired logic, or as outputs corresponding to pre-set ROM values. By way of further example, in a ROM embodiment, values on a monitored bus suitably comprise address values for a ROM, and values associated with that address are suitably used in conjunction with determining whether bus traffic is acceptable or problematic.

It is claimed:
1. A digital processor security device comprising:
a central processor unit;
a first data bus in data communication with the central processor unit, the first data bus disposed between the central processor and a southbridge controller;
a controller hub in data communication with the central processor unit via the first data bus; and a police bridge disposed between the central processing unit and the controller hub on the first data bus, the police bridge operable to passively monitor a state of data communicated via the first data bus by sniffing a state of the bus by hardware logic operating independently of the central processor unit;

the police bridge including a trusted certificate manager operable in accordance with encryption protocols associated with a monitored state of the first data bus;

the police bridge further operable to generate key data in accordance with a data transmission protocol associated with the state of the first data bus; the police bridge further operable to generates a memory control signal in accordance with a monitored state of the first data bus relative to a generated key; and a second police bridge disposed between the southbridge controller and a super input/output controller.

2. The security device of claim 1 further comprising a converter operable to convert the data transmission protocol to a selected data encryption protocol, and wherein the police bridge is further operable to transmit converted data to the central processor unit.

3. The security device of claim 1 wherein the first data bus is disposed between a southbridge controller and a super input/output controller, and wherein the southbridge controller is in data communication with the central processor unit.

4. The security device of claim 1 wherein the police bridge is further operable to generate the memory control signal as a memory erase signal in accordance with the monitored state of the first bus and the generated key.

5. The security device of claim 1 wherein the police bridge is further operable to delete the generated key after completion of a data communication session with the central processor unit.

6. A method of secure data communication comprising of:
communicating data between a peripheral controller and a central processor via a data bus;
sniffing data communicated via the data bus by a police bridge disposed between the central processing unit and the peripheral controller, the police bridge comprising hardware logic operating independently of the central processor;
generating key data, by the police bridge, in accordance with a data communication session on the data bus in accordance with the step of sniffing;
selectively communicating data, by the police bridge, between the peripheral controller and the central processor in accordance with the key data;
generating a memory control signal, by the police bridge, in accordance with a monitored state of the data bus and the key data; and
communicating data via a second police bridge disposed between a southbridge controller and a super input/output controller.

7. The method of claim 6 further comprising of converting the data transmission protocol to a selected data encryption protocol.

8. The method of claim 6 where wherein the step of communicating data includes communicating data via the bus disposed between the central processor and the southbridge controller.

9. The method of claim 6 further comprising of generating the memory control signal as a memory erase signal in accordance with the monitored state of the bus and the generated key.

10. The method of claim 6 further comprising of deleting the generated key after completion of a data communication session with the central processor unit.

11. A security device comprising:
a central processor unit;
an input/output controller in data communication with the central processor unit;
a data bus operable to communicate data between the central processor unit, the input/output controller and a southbridge controller; and
a police bridge associated with the data bus and disposed between the central processor unit and the input/output controller, the police bridge being operable passively to sniff data content associated with a communication between the central processor unit and the input/output controller via the data bus by hardware logic operating independently of the central processor unit;
the police bridge being distinct from the central processor unit,
the police bridge including an associated data storage inclusive of trusted communication data;
the police bridge further operable to test sensed data relative to the trusted communication data;
the police bridge further operable to generate a breach threat signal in accordance with a test of the sensed data via the police bridge; and
a second police bridge disposed between the southbridge controller and a super input/output controller.

12. The device of claim 11 wherein the data storage is comprised of a memory operable for storing the trusted communication data as key data associated with at least one trusted certificate.

13. The device of claim 11 wherein the police bridge is comprised of system-on-chip operable to test the sensed data in accordance with operation of a processor integrated therewith.

14. The device of claim 11 wherein the police bridge is comprised of programmable array operable to generate the breach threat signal.

15. The device of claim 11 wherein the police bridge is comprised of combinational hardware logic operable to generate the breach threat signal.

16. The device of claim 11 wherein the police bridge is further operable to generate the memory control signal as a memory erase signal in accordance with the monitored state of the first bus and the generated key.

* * * * *